(12) United States Patent
Hara

(10) Patent No.: US 10,686,964 B2
(45) Date of Patent: Jun. 16, 2020

(54) INFORMATION PROCESSING APPARATUS PREVENTING RISK OF SHORTENED LIFETIME OF STORAGE DEVICE AND CONTROL METHOD THEREFOR

(71) Applicant: CANON KABUSHIKI KAISHA, Tokyo (JP)

(72) Inventor: Kenji Hara, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/910,838

(22) Filed: Mar. 2, 2018

(65) Prior Publication Data

US 2018/0262642 A1    Sep. 13, 2018

(30) Foreign Application Priority Data

Mar. 10, 2017 (JP) .................. 2017-046508

(51) Int. Cl.

| | |
|---|---|
| H04N 1/32 | (2006.01) |
| G03G 15/00 | (2006.01) |
| B41J 2/045 | (2006.01) |
| G06F 1/26 | (2006.01) |
| G06F 3/12 | (2006.01) |
| H04N 1/00 | (2006.01) |
| G06F 1/3203 | (2019.01) |
| G06F 1/3206 | (2019.01) |
| G06K 15/00 | (2006.01) |

(52) U.S. Cl.
CPC ........ *H04N 1/32625* (2013.01); *B41J 2/0457* (2013.01); *G03G 15/55* (2013.01); *G03G 15/553* (2013.01); *G06F 1/26* (2013.01); *G06F 3/1239* (2013.01); *H04N 1/00053* (2013.01); *H04N 1/32657* (2013.01); *H04N 1/32662* (2013.01); *G06F 1/3203* (2013.01); *G06F 1/3206* (2013.01); *G06K 15/4055* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,000,021 A | * | 12/1999 | Saito ...................... | B82Y 10/00 365/185.09 |
| 2006/0055971 A1 | * | 3/2006 | Fukuhara ............ | G06F 11/0733 358/1.16 |

(Continued)

FOREIGN PATENT DOCUMENTS

| | | | |
|---|---|---|---|
| JP | 2001350596 A | * | 12/2001 |
| JP | 2008-257411 A | | 10/2008 |

OTHER PUBLICATIONS

Takamukai, Eiji, Storage Device, 2001, JP-2001350596-A English Translation, par 0011, 0014, 0018-0022 (Year: 2001).*

*Primary Examiner* — Miya J Williams
(74) *Attorney, Agent, or Firm* — Canon U.S.A., Inc. IP Division

(57) ABSTRACT

An information processing apparatus including a storage device obtains an energized time to the storage device in a standby state where no job is being executed and a number of accesses to the storage device during the standby state. The information processing apparatus provides a display relating to a lifetime of the storage device based on the energized time and the number of accesses to the storage device.

11 Claims, 6 Drawing Sheets

(56) References Cited

U.S. PATENT DOCUMENTS

| | | | |
|---|---|---|---|
| 2006/0250137 A1* | 11/2006 | Frey | B60L 58/16 |
| | | | 324/426 |
| 2008/0270696 A1* | 10/2008 | Murayama | G06F 1/3221 |
| | | | 711/114 |
| 2009/0228666 A1* | 9/2009 | Kurashige | G06F 12/0246 |
| | | | 711/156 |
| 2012/0137087 A1* | 5/2012 | Umimura | H04N 1/2183 |
| | | | 711/154 |
| 2012/0226881 A1* | 9/2012 | Yi | 711/163 |
| 2016/0162205 A1* | 6/2016 | Grimsrud | G06F 3/0616 |
| | | | 711/103 |
| 2017/0131948 A1* | 5/2017 | Hoang | G06F 3/0653 |
| 2017/0262033 A1* | 9/2017 | Rotbard | G06F 1/263 |
| 2018/0203623 A1* | 7/2018 | Imamura | G06F 3/0619 |
| 2018/0210679 A1* | 7/2018 | Hikichi | G06F 3/122 |

* cited by examiner

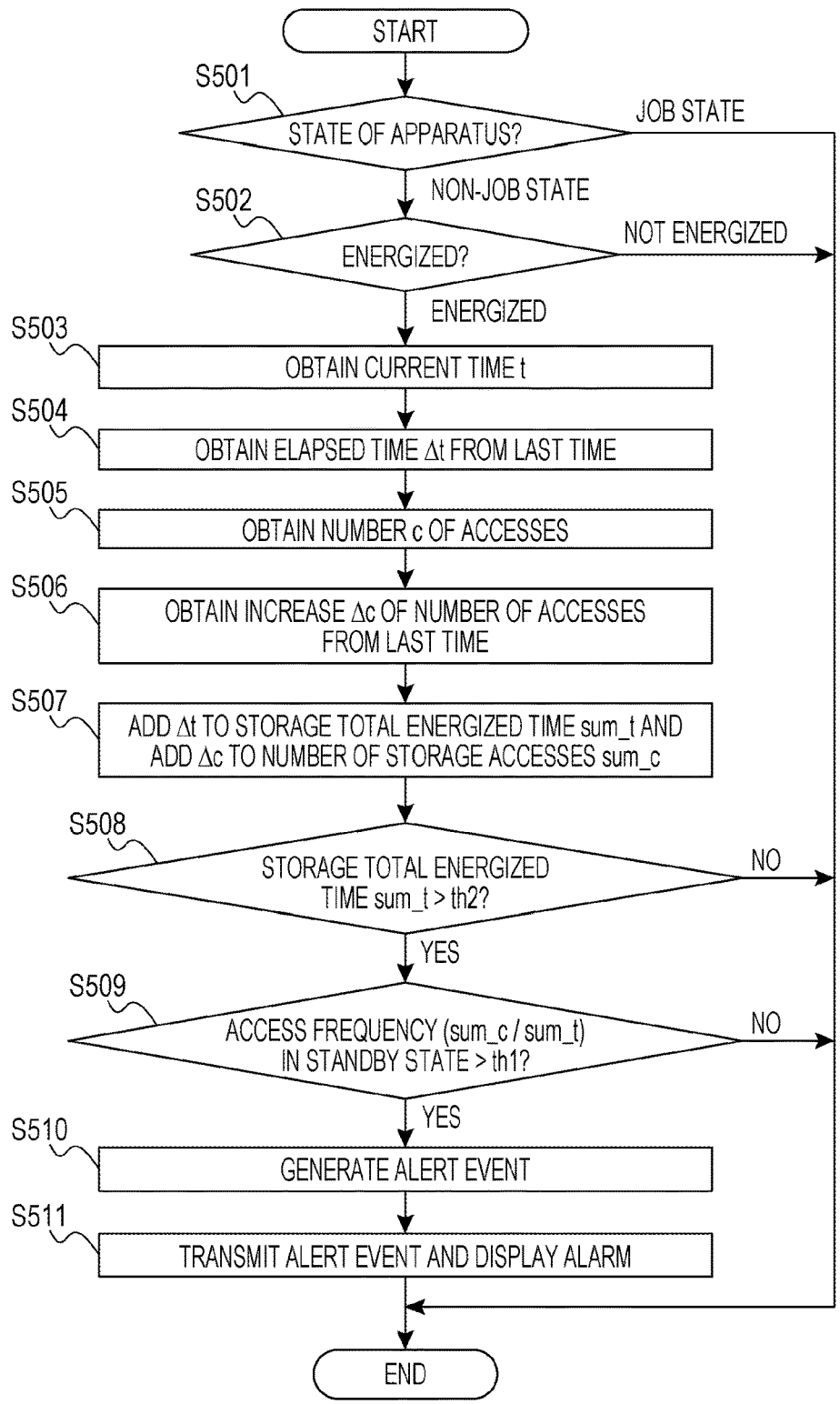

INFORMATION PROCESSING APPARATUS PREVENTING RISK OF SHORTENED LIFETIME OF STORAGE DEVICE AND CONTROL METHOD THEREFOR

BACKGROUND

Field

The present disclosure relates to an information processing apparatus and a control method therefor.

Description of the Related Art

A multi-function peripheral (MFP) is an image forming apparatus including a copy function, a print function, a reading function and so on. The MFP can include a hard disk drive as a large-capacity storage device. The hard disk drive can involve physical operations and can therefore be categorized as a part with a higher failure rate. The hard disk drive can keep its normal state by using an alternative area that is prepared in advance instead of an area with a data reading or writing failure. For example, Japanese Patent Laid-Open No. 2008-257411 discloses prediction of a failure based on the number of alternative areas obtained from an internal log of a hard disk.

SUMMARY

An information processing apparatus embodying an aspect of the present disclosure includes a first obtaining unit configured to obtain an energized time to the storage device in a standby state where no job is being executed by the information processing apparatus, a second obtaining unit configured to obtain a number of accesses to the storage device during the standby state, and a control unit configured to provide a display relating to a lifetime of the storage device based on the energized time and the number of accesses.

Further features of the present invention will become apparent from the following description of exemplary embodiments with reference to the attached drawings.

BRIEF DESCRIPTION OF THE DRAWINGS

FIG. 5 is a flowchart illustrating obtaining of a frequency of access to the storage device in the MFP according to the embodiment and involved processing.

DESCRIPTION OF THE EMBODIMENTS

Embodiments of the present disclosure will be described below with reference to attached drawings. It is not intended that the following embodiments limit the present disclosure and that all of combinations of features according to the embodiments are not necessary.

Figure 1:
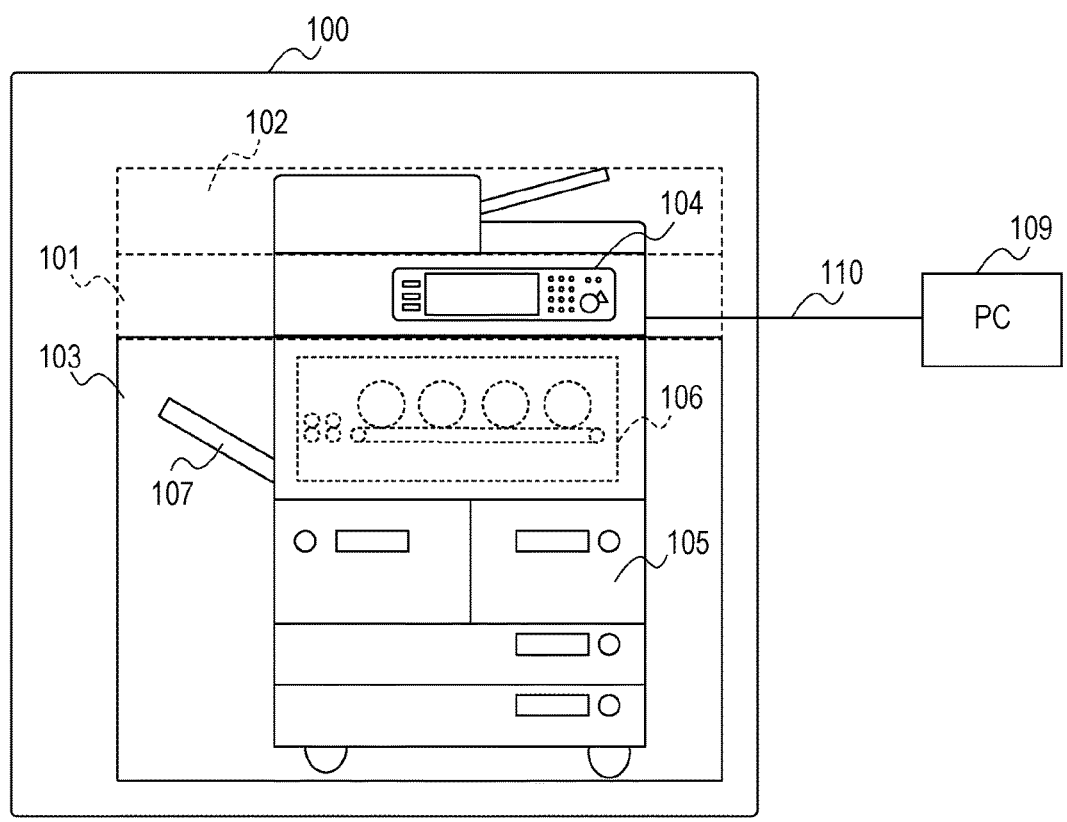
FIG. 1 is a block diagram illustrating a configuration of a multi-function peripheral (MFP) according to an embodiment of the present disclosure.

FIG. 1 is a block diagram illustrating a configuration of a multi-function peripheral (MFP) 100 according to an embodiment of the present disclosure. According to this embodiment, the multi-function peripheral 100 is an example of the information processing apparatus according to the present disclosure. However, it is not intended that the present disclosure is limited thereto.

The MFP 100 includes a controller unit 101 that controls operations to be performed in the MFP 100, a scanner unit 102, and a printer unit 103. The controller unit 101 includes, on its front surface, an operating unit 104 operated by a user. The operating unit 104 includes a display unit with a touch panel function and a keyboard unit including hardware keys. The MFP 100 is coupled to a PC (personal computer) 109 over a network 110. The printer unit 103 includes a sheet cassette 105, an image forming unit 106 configured to from (print) an image by performing electrophotographic processing on a sheet fed from the sheet cassette 105, and a discharge tray 107 that discharges a sheet with an image thereon formed by the image forming unit 106.

In order to copy a document using the MFP 100, a user can place the document on the scanner unit 102 and instruct a copy operation via the operating unit 104. In response thereto, the controller unit 101 controls the scanner unit 102, and the scanner unit 102 feeds and scans the document to generate image data. The controller unit 101 receives the image data and instructs a printing operation to the printer unit 103 based on the image data. Thus, the printer unit 103 feeds a sheet from the sheet cassette 105, performs the printing operation based on the image data in the image forming unit 106, and outputs the printed sheet to the discharge tray 107. The copy processing completes here. An operation to be instructed directly by a user or an operation scheduled to be automatically performed at a time defined by a user, for example, is generally called a job.

The MFP 100 shifts to a sleep mode where a display unit on the operating unit 104 shuts off if it is detected that a time without continuous operations of the MFP 100 reaches a predetermined time or that a user presses a power saving key on the operating unit 104. The MFP 100 in the sleep mode still monitors the network 110. If the MFP 100 receives a printing request from the PC 109 connected thereto over the network 110, the controller unit 101 activates. The controller unit 101 then communicates with the PC 109 to receive a print job from the PC 109 and generates image data in a bit map format. The controller unit 101 controls the printer unit 103 to execute a printing operation including forming the corresponding image on a sheet fed from the sheet cassette 105 and outputting the resulting sheet to the discharge tray 107. When the printing completes, the NFP 100 quickly shifts to the sleep mode.

Figure 2:
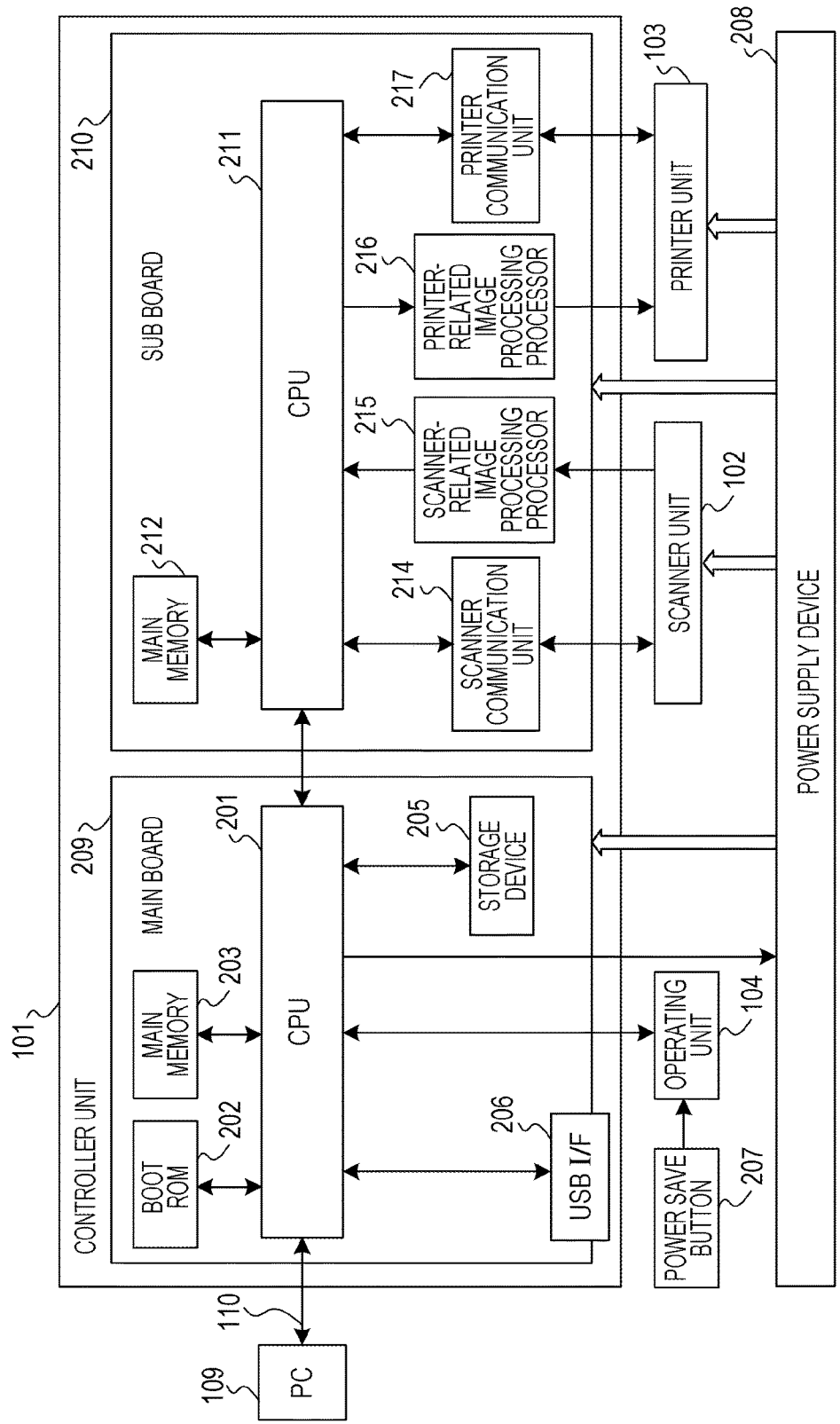
FIG. 2 is a block diagram mainly illustrating a configuration of a controller unit in the MFP according to the embodiment.

FIG. 2 is a block diagram illustrating a configuration of the controller unit 101 in the NFP 100 according to this embodiment.

The controller unit 101 includes a main board 209 and a sub board 210. The main board 209 is controlled by the CPU 201, and the CPU 201 executes a program in a boot ROM 202 when the MFP 100 is powered on. The program stored in a storage device 205 is extracted in a main memory 203. The program extracted in the main memory 203 can be executed to control an operation performed by the MFP 100. The CPU 201 uses the main memory 203 as a work memory and controls the operating unit 104, a USB-I/F 206, and the storage device 205, for example. According to this embodiment, the storage device 205 is a hard disk drive.

The hard disk drive includes a nonvolatile storage medium that is a magnetic body or a storage medium applying a semiconductor technology or electrically holding data. Many nonvolatile storage media excluding a hard disk drive have a limited lifetime, and the risk of occurrence of failures tends to increase when the access frequency thereto is high, like a hard disk drive. This embodiment is effectively applicable to a case using a nonvolatile storage medium influenced by the access frequency thereto. The present disclosure is not limited to a hard disk drive, though the storage device 205 according to this embodiment is described as a hard disk drive herein.

The operating unit 104 includes a power saving button 207. If the CPU 201 detects that the power saving button 207 is pressed, the CPU 201 controls the power supply 208 to shift to a power saving mode. The power supply 208 controls the energization state to the main board 209, the sub board 210, the scanner unit 102, and the printer unit 103.

The sub board 210 is controlled by the CPU 211 and is activated by the CPU 201 because the CPU 211 does not have a boot ROM. The CPU 211 controls the scanner unit 102 and the printer unit 103 and image processors 215 and 216 configured to perform image processing on image data exchanged therebetween. The CPU 211 and the CPU 201 communicate with each other to perform operations in coordination. The CPU 211 executes a program in the main memory 212 to perform control processing. A scanner communication unit 214 controls interface between the CPU 211 and the scanner unit 102. A printer communication unit 217 controls interface between the CPU 211 and the printer unit 103.

Next processing performed when the NFP 100 performs a copy operation will be described with reference to FIG. 2.

In response to a copy instruction from the operating unit 104, the CPU 201 transmits an instruction to scan a document from the scanner unit 102 to the CPU 211 and an instruction to print based on the resulting image data to the printer unit 103. The CPU 211 defines settings such as a scaling for image processing to be performed for reading a document in a scanner-related image processor 215 and instructs the scanner unit 102 to scan the document through the scanner communication unit 214. In response thereto, the scanner unit 102 optically scans the document and converts it to digital image data.

The CPU 211 receives the image data through the scanner-related image processor 215. The CPU 211 then defines settings for image processing such as UCR and gamma transformation in a printer-related image processor 216, causes the printer-related image processor 216 to execute the corresponding image processing on the image data, and transmits the processed image data to the printer unit 103 to print it. The printer unit 103 prints the image by performing an electrophotographic process based on the received image data and outputs a sheet with the image printed thereon external to the MFP 100.

In printing a plurality of copies, the CPU 211 transmits the image data obtained from the scanner unit 102 to the CPU 201 for electronic sorting. The CPU 201 temporarily stores the image data in the hard disk drive 205. In printing the second copy, the image data is transmitted from the CPU 201 to the CPU 211 to instruct to print it. This can eliminate the necessity for scanning processing to be performed by the scanner unit 102.

Figure 3:
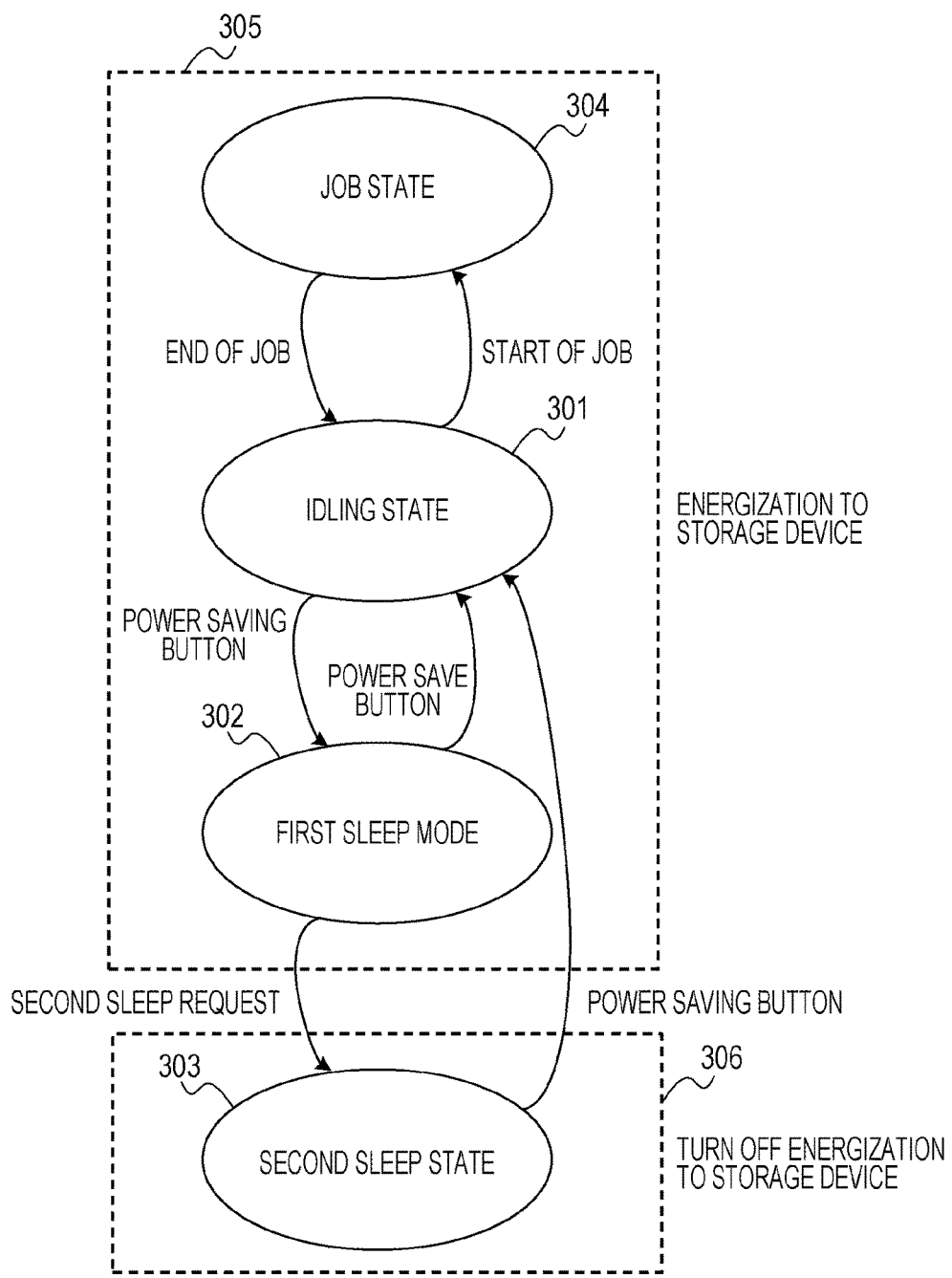
FIG. 3 illustrates states of the MFP and states of energization to the storage device according to this embodiment.

FIG. 3 illustrates states of the MFP 100 and states of energization to the storage device 205 according to this embodiment.

In an idling state 301, the main board 209, the sub board 210, the scanner unit 102, and the printer unit 103 are energized, and a job can be immediately executed. In this case, a user can operate the operating unit 104 to provide a copy instruction, for example. Thus, a "START JOB" event is issued, and the state is shifted to a job state 304. In the job state 304, printing or scanning a document is being performed based on the copy job as described above. When the job completes, an "END OF JOB" event is issued. Then, the state shifts to an idling state 301.

If a press of the power saving button 207 is detected in the idling state 301, a "POWER SAVING BUTTON" event is issued, and the state shifts to a first sleep state 302. In the first sleep state 302, an image cannot be formed, but the main board 209 is active. Therefore, in the first sleep state 302, energization to blocks for image formation and document scanning, that is, the sub board 210, the scanner unit 102, and the printer unit 103 are turned off. In the first sleep state 302, an HTTP server, for example, in the MFP 100 is activated so that processing such as referring an internal state of the MFP 100 from a web browser in the PC 109 over a network 10 is performed.

After a lapse of a predetermined time period from completion of processing to be performed by the main board 209, a "SECOND SLEEP REQUEST" is issued for saving power. The state then shifts to a second sleep state 303. In the second sleep state 303, the energization to the substantial part of the main board 209 is turned off. The second sleep state 303 is an ultralow power mode in which a minimum part for detecting a wake-up request from an external apparatus is energized. More specifically, the power saving button 207, a part of the operating unit 104, a part of the main memory 203, and a part of the CPU 201 are only energized, and the energization to other components is turned off or is changed to have a power saving state. In other words, in this state, the CPU 201 is completely deactivated or hardly operates. Therefore, power supply to the storage device 205 to be controlled by the CPU 201 is shut off.

If the power saving button 207 is pressed in the second sleep state 303, for example, a "POWER SAVING BUTTON" event is issued. The second sleep state 303 is shifted to the idling state 301, where it is ready for starting a job.

Among the four states illustrated in FIG. 3, the states enclosed by a dotted line 305 have energization to the storage device 205, while the state enclosed by a dotted line 306 does not have energization to the storage device 205.

Figure 4A:
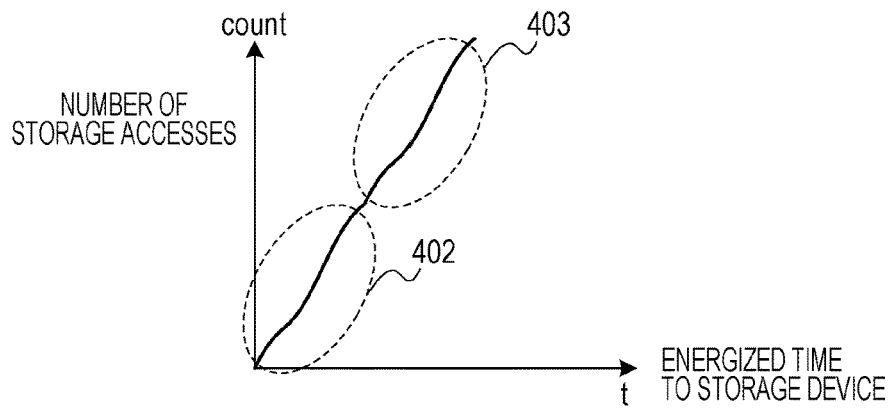
FIGS. 4A to 4C are graphs modeling three patterns of energized time to a storage device (horizontal axis) against total number of accesses (vertical axis).
Figure 4B:
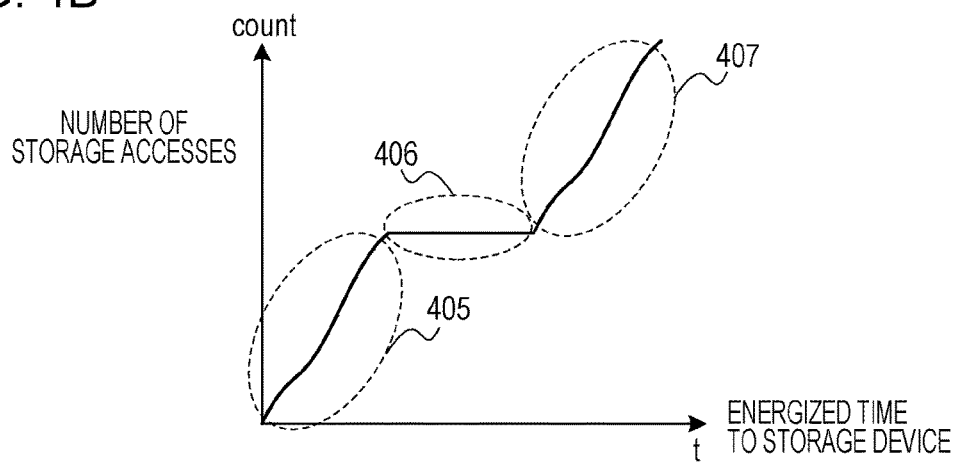
Figure 4C:
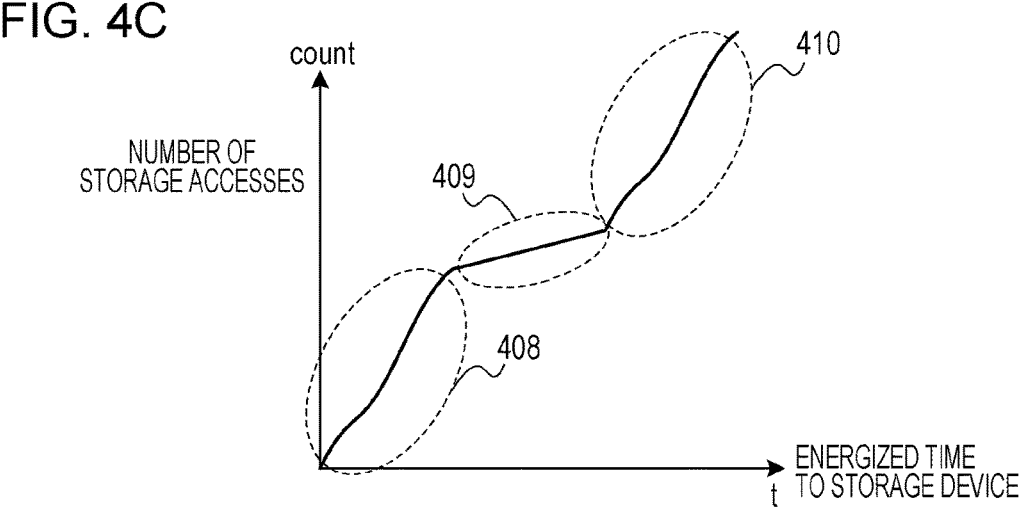

FIGS. 4A to 4C are graphs illustrating three patterns modeling an energized time (horizontal axis) to the storage device 205 against a total number of accesses (vertical axis).

FIG. 4A illustrates a transition model of an energized time to the storage device 205 against the number of accesses in Case 1. Case 1 does not stay so long in the idling state 301 and the first sleep state 302. In other words, Case 1 keeps the second sleep state 303 except for the job state 304 where a job is being executed. Thus, Case 1 includes a high number of accesses while the energized time to the storage device is short.

A state 402 with an increased number of accesses is obtained through use of the storage device 205 for executing an operation in the job state 304. When the state 402 is shifted to the second sleep state 303 immediately after that, the energization to the storage device 205 is terminated. Therefore, the increase of the energized time (horizontal axis) stops, and the number of accesses therefore does not increase. When the next job occurs, the job state 304 is obtained again where the corresponding operation is performed and accesses as in the state 403 occur. Therefore, the number of accesses increases, but the energized time to the storage device 205 tends to be significantly short. Case 1 is characterized in that a maximum number of accesses occur per unit time of the energized time, but that the energized time does not increase against the maximum number of accesses.

FIG. 4B illustrates a transition model of an energized time to the storage device 205 against the number of accesses in Case 2. Case 2 stays long in the idling state 301 and the first sleep state 302. A state 405 with an increased number of accesses is obtained via use of the storage device 205 for executing an operation in the job state 304. In the subsequent state 406, Case 2 stays in the first sleep state 302, resulting in termination of the increase of the number of accesses. However, the energization to the storage device 205 continues so that the energized time (horizontal axis) increases. In this case, the number of accesses (vertical axis) to the storage device 205 does not increase. Therefore, the energized time only increases without an increase of the number of accesses. When the job occurs, the number of accesses and the energized time increase as in a state 407 for performing the corresponding operation in the job state 304.

Case 2 tends to have a longer energized time to the storage device 205. If the storage device 205 is a hard disk drive, for example, a read/write head can be separated from the magnetic body while it is not accessed so that a stable state can be obtained where the lifetime of the head is not consumed. Therefore, the failure risk is not high because the lifetime is not easily consumed by the number of accesses though the lifetime is consumed by the total energized time. The failure risk is not high if the storage device 205 is a flash memory, an SSD or the like with a nonvolatile memory as a recording medium. For a nonvolatile storage device of semiconductor, a job for deleting internal data in blocks can be required in response to a write request. The total number of deletion can consume the lifetime of the semiconductor device, but the lifetime is not consumed by the number of accesses though accesses to the storage device 205 occur in the state 406.

FIG. 4C illustrates a transition model of an energized time to the storage device 205 against the number of accesses in Case 3. Case 3 stays long (bad) in the idling state 301 and the first sleep state 302.

A state 408 having an increased number of accesses s obtained through use of the storage device 205 for executing an operation in the job state 304. In the subsequent state 409, when the first sleep state 302 continues, the energization to the storage device 205 continues. Therefore, the energized time (horizontal axis) to the storage device 205 increases. When the number of accesses (vertical axis) to the storage device 205 occurs periodically, the number of accesses naturally increases toward the upper right. When the next job occurs, the subsequent state 409 shifts to a state 410 where the number of accesses and the energized time increase because the first sleep state 302 shifts to the job state 304 again. Case 3 tends to have a longer energized time to the storage device 205, like Case 2.

Because accesses to the storage device 205 occur intermittently in the state 409 in FIG. 4C, the head is returned to the magnetic body even after transition to a stable state that does not consume the lifetime of the storage device 205 if it is a hard disk drive, for example. As a result, the following risk about the hard disk drive can occur.

LOAD-DUTY is a concept functioning as one indication of a standby state of the hard disk drive and can be obtained by using Expression (1):

$$\text{LOAD-DUTY} = (\text{time period when the magnetic head waits on the magnetic body})/(\text{energized time to the hard disk}) \quad (1)$$

The value expressed by Expression (1) increases if periodical accesses continue for a period of time. A server requiring high reliability can apply a hard disk drive that can tolerate against operations with a high LOAD-DUTY and that is not easily failed even when the server accesses to the hard disk drive periodically for 24 hours. However, when a server applies an inexpensive hard disk drive with a high LOAD-DUTY, the server can overwork the hard disk drive. This means that hard disk drive includes an operation condition with a risk of future occurrence of a failure.

This is also applicable to a flash memory, an SSD and so on, each with a nonvolatile memory as a recording medium. A nonvolatile memory manufactured by a NAND process includes a lifetime not substantially influenced by the number of reading operations and the energized time thereto, but is influenced by the number of deletions of internal data in response to write requests. In other words, in a case where the state 409 in FIG. 4C is caused by an increased number of writing operations, the lifetime of the storage device tends to be consumed. If the state 409 is caused by an increased number of reading operations, the lifetime is not consumed. Storage devices excluding a hard disk drive and consuming their lifetimes due to the number of accesses thereto have a similar tendency. Therefore, this embodiment is applicable thereto.

Whether a storage device includes a state that consumes its lifetime or not can be determined based on Expression (1). However, it does not have to be determined based only on the value.

For example, in Case 1 in FIG. 4A, the value of Expression (1) is high because the energized time does not increase, but the energized time to the storage device 205 short. Therefore, the storage device 205 includes a healthy state that may hardly fail. This means that the lifetime and consumed state of the storage device 205 cannot be only determined simply based on Expression (1).

FIG. 5 is a flowchart illustrating obtaining of a frequency of accesses to the storage device 205 in the MFP 100 according to the embodiment and involved processing. The processing can be implemented by execution of a program extracted in the main memory 203 by the CPU 201. The processing illustrated in the flowchart is executed at predetermined time periods.

First, in S501, the CPU 201 checks the state of the MFP 100. According to this embodiment, one of the job state 304, the idling state 301, the first sleep state 302, and the second sleep state 303 illustrated in FIG. 3 is identified. If the MFP 100 includes the second sleep state 303, the CPU 201 may not execute the processing because the CPU 101 stops operating. However, no problem occurs because the storage device 205 is powered off. If the MFP 100 currently includes the job state 304, the hard disk drive 205 is necessarily accessed due to the job Therefore, the processing ends, and the measurement is not performed.

If the CPU 201 in S501 determines that no job is executed, the processing moves to S502 where the CPU 201 determines whether the storage device 205 is energized. According to this embodiment, the energization to the storage device 205 is turned off only in the second sleep state 303. It can be configured that the energization to the storage device 205 is turned off when the access frequency is low instead of synchronization with the states illustrated in FIG. 3. If it is determined in S502 that the energization to the storage device 205 is off, the processing ends. If it is determined that the energization is on, the processing moves to S503. The CPU 201 in S503 obtains a current absolute time "t". The processing then moves to S504 where the CPU 201 calculates an elapsed time Δt(T−t) from the last measurement time (T). Next, in S505, the CPU 201 obtains a number "c" of accesses to the storage device 205 during the period.

A plurality of methods is available for obtaining the number of accesses. The number of accesses can be obtained by, for example, hooking an API to be accessed in software, referring to the status of a kernel block device, measuring the number of operations performed by a device driver for the storage device 205, or referring to log information within the storage device 205. Because the number of accesses to the storage device 205 obtained in S505 is an absolute value, the CPU 201 in S506 obtains a difference "Δc" between the last number of accesses and the present number of accesses.

After the elapsed time "Δt" from the last execution of the processing and an increase value "Δc" of the number of accesses to the storage device are obtained, the processing moves to S507. The CPU 201 in S507 adds "Δt" to a total storage energized time "sum_t" with no job executed and adds "Δc" to a total number of storage accesses "sum_c" with no job executed. This updates both of the total storage energized time "sum_t" and the total number of storage accesses "sum_c" to the latest values.

Next, in S508, the CPU 201 determines whether the total storage energized time "sum_t" is longer than a predetermined time period (th2). If it is shorter than the predetermined time period, the processing ends. If the total storage energized time "sum_t" is longer than the predetermined time period (th2), the processing moves to S509 where the CPU 201 determines whether the access frequency during the standby state is higher than a predetermined threshold value (th1). The access frequency during the standby state can be obtained by dividing the total number of storage accesses "sum_c" by the total storage energized time "sum_t". If it is determined that the access frequency during the standby state is higher than the predetermined threshold value (th1), the processing moves to S510 where the CPU 201 generates an alert event. In S511, the CPU 201 transmits the alert event to a plurality of destinations, including the server, and causes the operating unit 104 to provide a display (alarm message). The processing then ends. In this case, the display can be transmitted to an external PC 109 connected to the network 110 over the network to display it. The display can be transmitted over the network 110 to a server for a large company for remote monitoring the MFP 100, and the information thereof can be used for maintenance of the MFP 100.

Referring to FIG. 5, the number of accesses to a job status is counted only once when the job state 304 is shifted to the idling state 301. However, the addition in S507 may not be performed for the first state transition, or "Δc" and "Δt" may not be calculated from the second state transition after the first state transition, meaning that the frequency is obtained from "sum_t" and "sum_c".

The reason for not performing the measurement if the total storage energized time "sum_t" is shorter than the predetermined time period (th2) in S508 is that there is a possibility that the calculation in S509 results in a large error if the total storage energized time "sum_t" is short. It is also for excluding a case where a longer total storage energized time "sum_t" does not cause a problem relating to the lifetime of the storage device. Therefore, the processing in S508 can be omitted.

The predetermined time period (th2) can be changed based on the performance, type or the like of the storage device 205, and the product lifetime of the MFP 100. For example, in a case where the NFP 100 has a product lifetime of five years, the measurement can be started after six months from shipment from factory. In this case, the predetermined time period (th2) is equal to six months. An example of the calculation will be described below.

In accordance with the type of the storage device 205, the number "Δc" of accesses in S505 is changed as follows. That is, the number "Δc" of accesses is equal to a total sum of a Read count and a Write count in a case where the storage device 205 is a hard disk drive. A Write count is only adopted in a case where the storage device 205 is a flash-related storage device. This is because the category of consumption of the lifetime of the storage device 205 depends on the type of the storage device 205. If the storage device 205 is detected upon start, the MFP 100 determines the type of the storage device 205. Based on the identified type, whether the count includes a total sum of a Read count and a Write count or a Write count only is decided.

Figure 6:
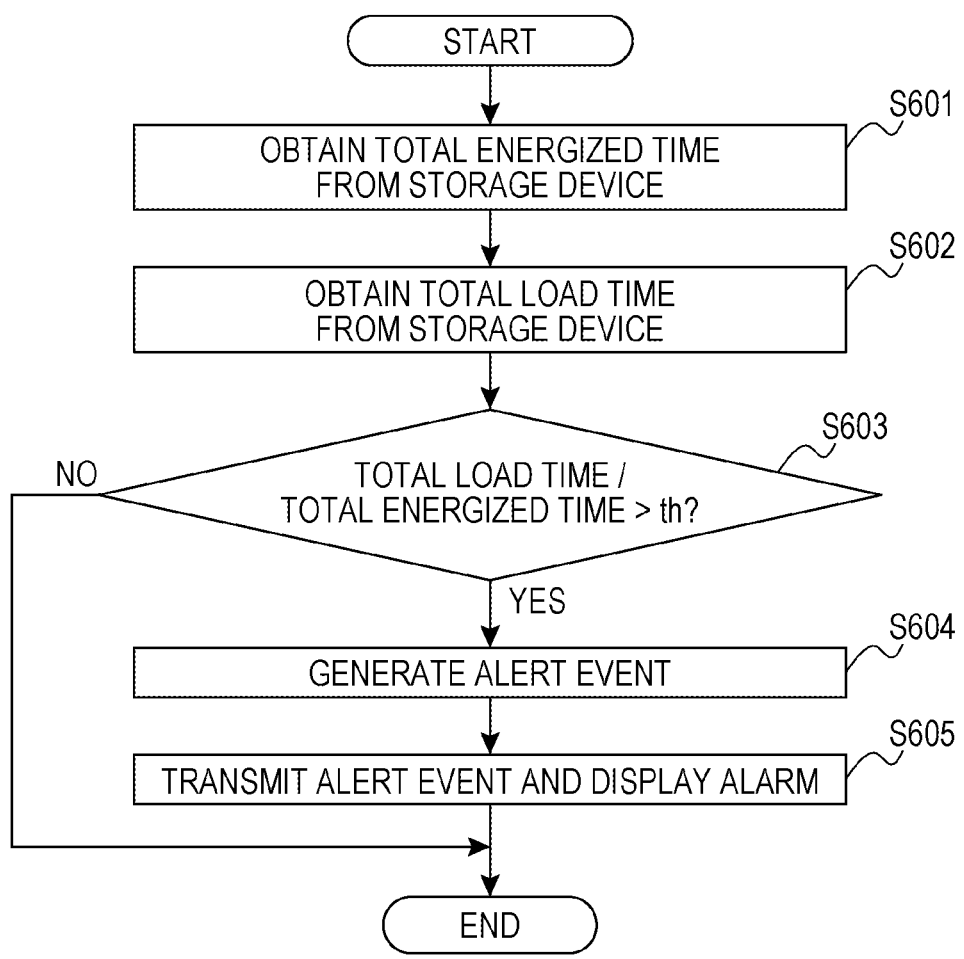
FIG. 6 is a flowchart illustrating processing for obtaining an operating state of the storage device in the MFP according to the embodiment.

In a case where the unit of "t" is a second and one access occurs in one second, the computing result in S509 is "1" or 100%. If no access occurs in one second, the result is "0". For example, the result greater than or equal to 100% can be rounded down so that the threshold value (th1) can be a value between 0 to 100%. The threshold value (th1) depends on the type of the storage device 205. For example, "90%" can be set for a hard disk drive with high durability, and "30%" can be set for a hard disk drive with low durability. FIG. 6 is a flowchart illustrating processing for obtaining an operating state of the storage device 205 in the MFP 100 according to this embodiment. The processing can be implemented by execution of a program extracted in the main memory 203 by the CPU 201.

First in S601, the CPU 201 obtains a total energized time to the storage device 205 from the storage device 205 by using SMART, for example, of the storage device 205. SMART is officially written as "S.M.A.R.T.". S.M.A.R.T. stands for Self-Monitoring, Analysis, and Reporting Technology. S.M.A.R.T. is a monitoring system included in computer hard disk drives (HDD) and solid-state drives (SSDs) that detects and reports on various indicators of drive reliability, with the intent of enabling the anticipation of hardware failures. Next, in S602, the CPU 201 obtains the total number of accesses to the storage device 205 from the storage device 205. Next, in S603, the CPU 201 calculates the total number of accesses/the total energized time to obtain the ratio of the state that the head is present on the magnetic body of the storage device 205. Whether the ratio is higher than a predetermined value (th) is determined. If it is determined that the rate that the head is present on the magnetic body is high, i.e., the head can be worn away, the processing moves to S604. If the rate is not determined to be high, the processing ends. In S604, the CPU 201 generates an alert event. In S605, the CPU 201 transmits the alert event to a plurality of destinations. The processing then ends. In S605, a corresponding alarm message can be displayed on the operating unit 104 in the MFP 100. The alert event can be transmitted over the network 110 to a server in the PC 109, for example, to display it. The alert event can be transmitted over the network 110 to a server for a large company for remote monitoring the MFP 100, and the information thereof can be used for maintenance of the MFP 100.

Like the case illustrated in FIG. 5, if the total energized time is shorter than the predetermined time period in the flowchart in FIG. 6, the processing can end.

The predetermined time period can be changed as required based on the performance, type or the like of the storage device 205 and the product lifetime of the MFP 100.

The predetermined value (th) used in S603 can be changed based on the performance, type or the like of the storage device 205 and the product lifetime of the MFP 100.
Other Embodiments The present disclosure can be implemented by processing including supplying a program that implements one or more functions of the aforementioned exemplary embodiments to a system or an apparatus over a network or via a storage medium and causing one or more processors in a computer in the system or apparatus to read and execute the program. Alternatively, the present disclosure can be implemented by a circuit (such as an ASIC) that implements one or more of the functions.

Hard disk drives of an expensive model and of an inexpensive model are available. For example, a hard disk drive of an expensive model is manufactured for a server such that it does not fail even when it is energized for 24 hours and is accessed with a high frequency. A hard disk drive of an inexpensive model is manufactured presuming that it is not to be accessed with a high frequency. In an apparatus that includes a hard disk drive of such an inexpensive model, when continuous accesses to the hard disk drive occurs with a high access frequency, there is a risk that the lifetime of the hard disk drive becomes shorter than the lifetime of the apparatus itself. In particular, there is a highly likelihood of such an occurrence in an apparatus including a virtual memory or a server function. The present embodiment enables estimating and preventing, in advance, an influence on the lifetime of the main body of the apparatus including such a hard disk drive.

The present embodiment provides a display relating to the lifetime of a storage device based on a state of the storage device while no job is being executed.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Plc-ray Disc (BD)™), a flash memory device, a memory card, and the like.

While exemplary embodiments have been provided, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-046508 filed Mar. 10, 2017, which is hereby incorporated by reference herein in its entirety.

What is claimed is:

1. An information processing apparatus comprising:
a nonvolatile storage device, and
a controller including a memory storing instructions and a processor which executes instructions, the controller being configured to:
obtain a total time in which power is supplied to the storage device and a total number of accesses to the storage device; and
notify information relating to a lifetime of the storage device in accordance that the total time is longer than a first threshold value and an access frequency obtained by dividing the total number of accesses by the total time is larger than a second threshold value different from the first threshold value,
wherein the storage device is a semiconductor storage device or a magnetic storage device,
wherein the total number of accesses to the semiconductor storage device includes a number of write operations and excludes a number of read operations, and
wherein the total number of accesses to the magnetic storage device includes the number of write operations and the number of read operations.

2. The information processing apparatus according to claim 1, wherein the controller does not notify the information relating to the lifetime of the storage device if the total time is shorter than a first threshold value.

3. The information processing apparatus according to claim 2, wherein the first threshold value is determined based on one or more of a performance of the storage device, a type of the storage device, and a product lifetime of the information processing apparatus.

4. The information processing apparatus according to claim 1, wherein the controller determines whether the storage device is a storage device involving physical operations or not.

5. The information processing apparatus according to claim 1, wherein the controller notifies an external device of issuance of the warning.

6. The information processing apparatus according to claim 1, wherein the controller does not notify the information relating to the lifetime of the storage device in a case where the access frequency is smaller than a second threshold value.

7. The information processing apparatus according to claim 1, wherein the second threshold value is determined based on a type of the storage device.

8. The information processing apparatus according to claim 1, wherein the controller is configured to:
confirm a state of power of the information processing apparatus; and
obtain the total time and the total number of accesses in accordance that the state of power of the information processing apparatus is a state where no job is being executed and the power is supplied to the storage device.

9. The information processing apparatus according to claim 1, wherein the total number of accesses is a number of accesses to the storage devise in the total time.

10. The information processing apparatus according to claim 1, wherein the controller is configured to notify the information to an external device via a network.

11. The information processing apparatus according to claim 1, wherein the controller displays the information on a display.

* * * * *